United States Patent [19]

Bertrand

[11] 3,977,891

[45] Aug. 31, 1976

[54] ROAD-SURFACING COMPOSITIONS CONTAINING FILLER MATERIALS

[75] Inventor: Olivier Bertrand, Gaurain Ramecroix, Belgium

[73] Assignee: Societe Generale des Ciments Portland de l'Escaut, Antoing, Belgium

[22] Filed: Feb. 5, 1975

[21] Appl. No.: 547,203

Related U.S. Application Data

[63] Continuation of Ser. No. 375,854, July 2, 1973, abandoned.

[30] Foreign Application Priority Data

July 13, 1972 Belgium .............................. 119859

[52] U.S. Cl. .......................... 106/281 R; 106/282; 106/283; 106/291; 106/DIG. 3
[51] Int. Cl.² ..................... C08L 95/00; C09D 3/24; C04B 31/18; C08K 7/00
[58] Field of Search ........... 106/281, 282, 283, 291

[56] References Cited
UNITED STATES PATENTS

| 1,235,989 | 7/1917 | Mertens | 106/281 R |
| 1,549,656 | 7/1925 | Drummond | 106/281 R |
| 1,596,232 | 7/1926 | Black | 106/281 R |
| 2,384,671 | 9/1942 | Fratis | 106/281 |
| 2,510,971 | 6/1950 | Goddin | 106/281 |

FOREIGN PATENTS OR APPLICATIONS

| 595,081 | 3/1960 | Canada | 106/281 R |
| 526,351 | 9/1940 | United Kingdom | 106/281 R |

Primary Examiner—Joseph L. Schofer
Assistant Examiner—Herbert J. Lilling

[57] ABSTRACT

A filler material for a road paving composition is described, the material having a low sensitivety to water and having fine gravel, pebbles and an organic binder selected from the group consisting of ashphalt, bitumen and tar, said filler material comprising at least one natural hydrated silicate selected from the group consisting of kaolinite, antigorite, sepiolite and palygorskite, said hydrated silicate having been subjected to a heat treatment at a temperature between 200°C and 800°C to irreversibly remove water of hydration to enhance porosity and ability to absorb bitumen, said filler material having a fineness at which at least 80% by weight will pass through a 74 micron screen, a porosity of at least 50% by volume and a swelling factor of not more than 3% in water after said organic binder has been absorbed therein.

5 Claims, No Drawings

ROAD-SURFACING COMPOSITIONS CONTAINING FILLER MATERIALS

This is a continuation, of application Ser. No. 375,854, filed Jul. 2, 1973, and now abandoned.

This invention relates to the production of road-surfacing compositions comprising fine gravel, pebbles and a dry mineral powder or filler coated in a soft organic binder such as asphalt, bitumen or tar.

Since practical experience has shown that the stability of heavy-duty, elastic coating intended for roads is intimately associated with the intrinsic properties of the filler, attempts are constantly being made to find new mineral materials which are chemically inert with respect to water, are able to absorb a high binder content and which show little or no tendency to swell or to separate from the binder in the presence of water. However, the choice of these materials involves difficult problems because the aforementioned criteria are not always reconcilable. Thus, if a substance used as filler is able to absorb a large quantity of binder, it is also able to absorb water and to swell to such an extent that surface disintegrates under damp weather conditions for example. In addition, although the main constituent of a finely powdered, natural or industrial mineral material may be ideally suitable as a filler, it is in danger of being contaminated by inseparable impurities capable of weakening the structure of the coating.

In order to avoid failures in the construction of roads based on soft organic binders, empirical standards have been established for fillers. These standards are continuously being revised in the light of research undertaken by the industries concerned. This research has already enabled certain natural minerals rich in silica to be exploited by heating them not only to dry them but also to make them more porous, the temperature being regulated to prevent the formation of free bases from the impurities present in these materials.

It has now been found that it is possible by subjecting certain hydrated minerals to the treatment to obtain highly porous fillers which are highly absorbent to soft binders and which are able to provide the surfaces of roads both with excellent weather resistance and a high resistance to road traffic. In addition, it is possible by adding measured quantities of materials known as fillers to these minerals to obtain ranges of fillers with properties adapted to the various requirements of the road-building industry.

In the process according to the invention for the production of a road-surfacing composition comprising fine gravel, pebbles and a dry mineral powder or filler coated in a soft organic binder such as asphalt, bitumen or tar, the filler is a hydrated mineral which undergoes irreversible transformation when subjected to heat treatment at temperatures of from about 200° to 800°C so that it acquires both a high degree of porosity and a high absorption capacity for the binder and, in this form, is able to provide the surfacing composition with excellent weather resistance and high stability to road traffic.

According to the invention, the hydrated mineral subjected to the heat treatment can be a natural hydrated silicate stable in its equidistance without replacement of interchangeable ions or with interrupted layers and fibrous facies, such as kaolinite, antigorite, sepiolite, palygorskite, similar hydrated minerals and mixtures of these substances, and can have added to it, either before or after the heat treatment, a material known as a filler such as a shale, a sandstone or any other siliceous material, a fly ash, an industrial slag, a similar mineral or a mixture of these substances, so that it is possible to obtain ranges of fillers with properties adapted to the various requirements of the road-building industry.

The mineral can be in the form of a natural or artificial mixture containing at least 50% by weight of the hydrated mineral and at least one hydrated silicate of different crystalline structure and/or an anhydrous silicate such as a feldspar, a mica, an amphibole or a similar mineral.

According to the invention, the hydrated mineral containing a carbonate material suitable for use as a filler, such as limestone, chalk, dolomite or similar material, is subjected to the heat treatment at a temperature reaching at most 500°C so that the resulting filler is without free base.

The nature of the chief mineral and of the additional minerals, and the nature of the heat treatment, have been selected primarily with a view to the need to produce calibrated fillers conforming to standards, i.e. dry powders of high fineness and porosity but without any appreciable chemical or physical reaction in water.

Some of the legal requirements vary slightly from one country to another and the test methods are capable of changing according to the type of road surface required, the type of binder, etc., although overall the basic criteria applied to fillers in regard to fineness, porosity, capacity to absorb binder and resistance to swelling in water, are substantially the same everywhere, whilst other secondary criteria, such as sensitivity to water and the tendency towards losses of material under heat, are readily satisfied and do not come into consideration here.

The standard published in 1967 by the Rijkswaterstaat of the Netherlands for bituminous concrete fillers is mentioned as one example of a standard; its stipulations can be summarised as follows:

Fineness: zero retention on a 2.4 mm screen and a maximum retention of 20% by weight on a 74 micron screen. Porosity: pore volume of 100 g of filler, compacted by Rigden's method, should reach at least 17 cc. Porosity can be expressed as voluminal porosity (Pv), i.e. that fraction of the total volume of the filler occupied by pores, the rest or voluminal concentration (Cv) being that fraction of the total volume of the filler constituted by solids (Pv + Cv = 1). Taking into account the real density $d$ of the filler and the pore volume P, the percentage voluminal porosity is $$P_v\% = 100 \ \frac{P}{P + \frac{100}{d}}$$

Bitumen index: the quantity of water which 100 g of non-compacted filler should absorb to form a viscous paste capable of showing a given resistance to penetration in VAN DER BAAN'S standardised test, this index (B) having to reach at least 27%. By analogy with the preceding criterion, VAN DER BAAN'S percentage voluminal porosity is defined by the following formula:

$$P_v, \% = 100 \ \frac{B}{B + \frac{100}{d}}$$

Resistance to swelling in water: increase (in %) in the volume of test specimens of a compacted filler-sand-bitumen mortar, made up under standardised conditions, when these test specimens are immersed in water; the swelling observed should not exceed 3% of the initial volume.

It is possible to associate with these stipulations a numerical relation known as the voluminal ratio (R) developed by A. Schuhbauer ("Bitumen-Teere-Asphalt-Peche und Verwandte Stoffe" 9/1966, pp. 340–345) between the voluminal concentrations according to Rigden ($C_v$) and Van der Baan ($C_v$,) R = $C_v/C_v$, whose value increases when a mineral powder tends to "react" with water (formation of hydrates, absorption of water between the crystalline laminae, etc.). This relation is important because the swelling of a mineral powder in the presence of water and the increase in voluminal ratio bear some relation to one another. In general, powders of limestone, slate and glauconiferous quartzite are found to have values for the ratio R of 1.21, 1.27 and 1.24, respectively, whilst the degree of swelling in water is consistent with the aforementioned Dutch standard. By contrast, in the case of mixtures of limestone and clay powders, the ratio R increases with the clay content, and ordinary clay itself has a ratio of 1.71 and an excessive swelling factor. This is hardly surprising when it is considered that clays are often selected precisely for their high absorption capacity with the result that, on the surface, hydrated magnesian and/or aluminous silicates, such as clays, are not suitable for use as fillers.

Nevertheless, it is possible by the heat treatment according to the invention to modify the crystalline structure of certain hydrated clays in such a way as to increase porosity and to reduce their tendency to swell below the accepted limit. When mixed in suitable proportions with other silicates or other mineral substances that are less porous or more prone to react with water, they are able to supply wide ranges of regulation fillers with various porosity levels and absorption capacities for bitumen or other binders.

The behaviour of two of these clays, designated here as sepiolite I and sepiolite II (these clays belong to a family of hydrated magnesian silicates with interrupted layers and fibrous facies), was studied at the heat treatment temperature. The results set out in Table I below confirm that there is a relation between the ratio R and swelling, the two values tending to decrease when the temperature is increased, and indicate that the ratio R should be less than 1.30 to obtain a degree of swelling of less than 3.0%.

TABLE I

| Type | Heat-treatment temperature (°C) | Ratio R | Swelling (%) |
|---|---|---|---|
| sepiolite I | 110 | 2.18 | 12.7 |
|  | 500 | 1.22 | 3.0 |
| sepiolite II | 110 | 2.65 | 16.4 |
|  | 300 | 2.42 | 16.1 |
|  | 500 | 1.95 | 8.6 |
|  | 600 | 1.31 | 5.4 |
|  | 750 | 1.29 | 2.5 |

Since the voluminal ratio can serve as a measure of the potential value of other silicates suitable for use as primary or as secondary fillers, they were progressively heated between 110° and 1000°C either on their own or in the presence of other mineral substances, and the fineness, real density, porosity and bitumen index of the product obtained was determined at several intermediate temperatures. The voluminal ratio was calculated on each occasion. On the other hand, since the test method prescribed by the Dutch standard for determining swelling is laborious and lacks a little precision, it was carried out with great care.

The results are set out in Tables II to V below which relate respectively to:

hydrated fibrous silicates (Table II A) and anhydrous fibrous silicates (Table II B), hydrated non fibrous silicates (Table III)

mixtures of fibrous hydrated silicates with a siliceous material (Table IV)

mixtures of fibrous and non-fibrous hydrated silicates with various materials known as fillers (Table V)

TABLE II

A. FIBROUS HYDRATED SILICATES

| Example | Analysis SiO$_2$ | Al$_2$O$_3$ | Fe$_2$O$_3$ | CaO | M$_g$O | Mineral | Temperature (°C) | Fineness (% retention on a 74 μ screen) | Density | Porosity (% by volume) | Bitumen index | (Voluminal ratio) (R) | Swelling (% by volume) |
|---|---|---|---|---|---|---|---|---|---|---|---|---|---|
| 1 | 55.3 | 2.4 | 0.8 | 2.0 | 16.9 | mostly sepiolite with a little quartz | 110 | 6.3 | 2.419 | 71.4 | 190.0 | 1.60 | — |
|  |  |  |  |  |  |  | 600 | 6.3 | 2.625 | 74.7 | 152.0 | 1.26 | — |
|  |  |  |  |  |  |  | 650 | 6.6 | 2.634 | 75.5 | 152.4 | 1.23 | 1.4 |
| 2 | 53.3 | 2.0 | 0.4 | 1.1 | 22.2 | mostly sepiolite | 110 | 12.0 | 1.900 | 50.9 | 185.2 | 2.28 | — |
|  |  |  |  |  |  |  | 650 | 15.0 | 2.610 | 73.1 | 138.0 | 1.24 | — |
|  |  |  |  |  |  |  | 700 | 14.0 | 2.660 | 73.2 | 129.6 | 1.19 | — |
| 3 | 58.4 | 2.9 | 0.8 | 0.8 | 25.2 | mostly sepiolite with a little illite and quartz | 110 | 7.2 | 2.577 | 57.4 | 160.0 | 2.18 | 12.7 |
|  |  |  |  |  |  |  | 300 | 8.6 | 2.601 | 61.1 | 115.0 | 1.56 | — |
|  |  |  |  |  |  |  | 500 | 11.0 | 2.611 | 61.2 | 82.0 | 1.22 | — |
|  |  |  |  |  |  |  | 750 | 8.0 | 2.649 | 59.1 | 74.0 | 1.22 | 2.3 |
| 4 | 57.6 | 3.4 | 1.0 | 0.6 | 23.6 | sepiolite with a little quartz | 110 | 9.6 | 2.481 | 55.0 | 196 | 2.65 | 16.4 |
|  |  |  |  |  |  |  | 300 | 13.7 | 2.520 | 55.9 | 178 | 2.42 | 10.1 |
|  |  |  |  |  |  |  | 400 | 21.0 | 2.526 | 55.5 | 156 | 2.18 |  |
|  |  |  |  |  |  |  | 450 | 20.0 | 2.548 | 55.5 | 150 | 2.13 | — |
|  |  |  |  |  |  |  | 500 | 15.8 | 2.603 | 56.6 | 134 | 1.95 | 7.0 |
|  |  |  |  |  |  |  | 550 | 16.2 | 2.607 | 66.1 | 115 | 1.36 | — |
|  |  |  |  |  |  |  | 600 | 16.0 | 2.611 | 66.4 | 111 | 1.31 | 4.0 |
|  |  |  |  |  |  |  | 650 | 13.6 | 2.614 | 66.6 | 110 | 1.29 | — |
|  |  |  |  |  |  |  | 700 | 16.2 | 2.627 | 66.8 | 109 | 1.28 | — |
|  |  |  |  |  |  |  | 750 | 7.7 | 2.674 | 67.2 | 110 | 1.29 | 1.9 |
|  |  |  |  |  |  |  | 900 | 5.0 | 2.720 | 57.0 | 73 | 1.28 | — |
|  |  |  |  |  |  |  | 1000 | 1.2 | 2.857 | 45.0 | 46 | 1.27 | 2.3 |

TABLE II-continued

| | | | | | | | | |
|---|---|---|---|---|---|---|---|---|
| 5 | attapulgite ‡ (85–90 %) | 110 | 16 | 2.475 | 70.4 | 219.0 | 1.90 | — |
| | | 650 | 20 | 2.862 | 76.3 | 144.4 | 1.21 | — |
| | sepiolite and other silicates (10–15%) ( ‡palygorskite or suberiform asbestos) | 750 | 19 | 2.584 | 72.4 | 135.6 | 1.24 | 2.5 |
| 6 | clino-chry-sotile (antigorite or serpentine) | 110 | — | 2.531 | 68.5 | 900 | 7.17 | — |
| | | 500 | — | 2.596 | 74.4 | 153.8 | 1.27 | 2.5 |

B. ANHYDROUS FIBROUS SILICATES

| | | | | | | | | |
|---|---|---|---|---|---|---|---|---|
| 7 | mostly riebeckite (amphibole or asbestos) | 110 | — | 3.186 | 72.6 | 221 | 2.21 | — |
| | | 500 | — | 3.247 | 60.4 | 52.3 | 1.08 | — |
| 8 | grunerite (amphibole or asbestos) | 500 | — | 3.581 | 66.6 | 87.0 | 1.30 | — |

TABLE III

NON FIBROUS HYDRATED SILICATES

| Example | Mineral | Temperature (C) | Fineness (% retention on a 74 screen) | Density | Porosity (% by volume) | Bitumen index | Voluminal ratio | Swelling (% by volume) |
|---|---|---|---|---|---|---|---|---|
| 9 | kaolinite-type china-clay with a little illite | 110 | 1.7 | 2.603 | 52.1 | 85.6 | 1.55 | — |
| | | 500 | 1.0 | 2.567 | 57.1 | 79.2 | 1.29 | 1.0 |
| 10A | kaolinite with a little illite | 110 | 2.4 | 2.597 | 47.2 | 83.0 | 1.67 | — |
| | | 500 | 2.4 | 2.594 | 52.7 | 74.0 | 1.30 | 1.0 |
| 10B | (increasing illite content) | 110 | 11.8 | 2.641 | 49.5 | 95.0 | 1.77 | — |
| | | 500 | 11.9 | 2.647 | 52.2 | 75.8 | 1.43 | — |
| 10C | | 110 | 9.9 | 2.638 | 45.0 | 82.2 | 1.74 | 4.5 |
| | | 500 | 7.4 | 2.648 | 49.5 | 69.6 | 1.43 | 2.9 |
| 11A | talcum and chlorite | 110 | 18 | 2.731 | 37.9 | 54.8 | 1.55 | — |
| | | 500 | 19 | 2.730 | 36.8 | 53.8 | 1.56 | — |
| 11B | | 110 | 0 | 2.766 | 47.6 | 70.4 | 1.54 | — |
| | | 500 | 0 | 2.770 | 47.6 | 68.0 | 1.51 | — |
| 12 | montmorillonite (bentonite) interstratified mica, orthose and quartz | 110 | 5.1 | 2.650 | 51.8 | 700 | 7.0 | samples destroyed |
| | | 500 | 3.9 | 2.640 | 52.6 | 230 | 3.4 | |
| | | 750 | 4.0 | 2.650 | 53.1 | 160 | 2.4 | |
| 13 | mostly vermiculite with a little muscovite | 110 | 12 | 2.701 | 55.0 | 250 | 3.43 | samples cracked |
| | | 500 | 13 | 2.650 | 59.5 | 126 | 1.74 | |

TABLE IV

Mixtures of hydrated silicates with a siliceous substance

The sepiolite of Example 3 treated at 500 C was mixed with a siliceous product taken from a lower Eocene calcareous tufa containing 55% of opal and 35% of quartz and treated at 350 C; the mixture is treated at 500 C.

| Example | Mixture of sepiolite and | calcareous tufa | Fineness (% retention on a 74 screen) | Porosity (%) by volume) | Voluminal ratio (R) | Swelling (%) |
|---|---|---|---|---|---|---|
| 14A | 100 | 0 | 8 | 61.2 | 1.22 | 3.0 |
| 14B | 80 | 20 | 8.3 | 59.0 | 1.23 | 2.3 |
| 14C | 50 | 50 | 9 | 56.0 | 1.21 | 2.0 |
| 14D | 0 | 100 | 10 | 51 | 1.25 | 1.4 |

TABLE V

Mixtures of fibrous and non-fibrous hydrated silicates with various materials known as fillers The kaolinite of Example 9 and the sepiolite of Example 3, both treated at 500 C, were mixed and various limestones: porphyry, shale, fly ashes and slag added to the resulting mixture to obtain powders with a fineness of the order of 10% retention on a 74 micron screen. The powders were treated at 500 C.

TABLE V (continued)

| Examples | Mixtures of kaolinite | sepiolite | various limestones | Porosity (% by volume) | Voluminal ratio (R) | Swelling (%) |
|---|---|---|---|---|---|---|
| 15A | 0 | 0 | 100 | 32 | 1.25 | 1.5 |
|  | 0 | 50 | 50 | 44 | 1.24 | 1.9 |
|  | 0 | 75 | 25 | 56 | 1.24 | 2.2 |
|  | 50 | 0 | 50 | 42 | 1.23 | 1.3 |
|  | 75 | 0 | 25 | 53 | 1.23 | 1.3 |
|  | 25 | 25 | 50 | 48 | 1.23 | 1.5 |
|  |  |  | porphyry |  |  |  |
| 15B | 0 | 0 | 100 | 32 | 1.20 | 1.4 |
|  | 0 | 50 | 50 | 46 | 1.21 | 2.0 |
|  | 25 | 25 | 50 | 43 | 1.21 | 1.5 |
|  |  |  | shale |  |  |  |
| 15C | 25 | 25 | 50 | 52 | 1.31 | 2.0 |
|  |  |  | flying ashes |  |  |  |
| 15D | 25 | 25 | 50 | 47 | 1.22 | 1.7 |
|  |  |  | slag |  |  |  |
| 15E | 25 | 25 | 50 | 40 | 1.25 | 1.6 |

It can be seen that it is possible to produce fillers with porosity levels ranging from more than 30% to beyond 55%.

It should be pointed out that the silicates investigated cannot all be used as such as fillers. Thus, talcum (Examples 11A and 11B) still has a voluminal porosity of less than 50% a voluminal ratio of greater than 1.50 at a temperature of 500°C; the degree of swelling was not determined. However, all the signs are that, when added in small quantities to a mineral powder of high porosity and low voluminal ratio, this substance could nevertheless form a regulation filler. Such substances as bentonite (Example 12) and vermiculite (Example 13) could be similarly used, their voluminal ratios being 2.5 and 1.78, respectively, whilst their sample mortars have a degree of swelling in water that can no longer be measured. Finally, it has not yet been possible suitably to determine the fineness and porosity of serpentine and asbestos (Examples 6, 7 and 8) because these substances are in the form of fairly elastic fibres that are difficult to size-reduce. Their voluminal ratio at 500°C is fairly low which would seem to indicate regulation swelling and, in addition, is confirmed in the case of Example 6. These substances, mixed in the same way as in the cases pointed out above, would certainly be suitable for use at least as additives to regulation fillers before being subsequently accepted as fillers in their own right after suitable means of size-reduction or division have been perfected.

Naturally the invention is by no means limited to the embodiments which have been described by way of example and modifications can be made without departing from the scope of the invention.

I claim:

1. A filler material for a road paving composition having a low sensitivity to water and having fine gravel, pebbles and an organic binder selected from the group consisting of asphalt, bitumen and tar, said filler material comprising at least one natural hydrated silicate selected from the group consisting of kaolinite, antigorite, sepiolite and palygorskite, said hydrated silicate having been subjected to a heat treatment at a temperature between 200°C and 800°C to irreversibly remove water of hydration to enhance porosity and ability to absorb bitumen, said filler material having a fineness at which at least 80% by weight will pass through a 74 micron screen, a porosity of at least 55% by volume and a swelling factor of not more than 3% in water after said organic binder has been absorbed therein.

2. A filler material as claimed in claim 1 further comprising at least one siliceous material selected from the group consisting of shale, sandstone, fly-ash and slag.

3. A filler material as claimed in claim 1 further comprising up to 50% of at least one material selected from those hydrated silicates having a crystalline structure different from those forming the natural hydrated silicate and a naturally anhydrous silicate.

4. A filler material according to claim 3 wherein the anhydrous silicate is selected from feldspar, mica and amphibole.

5. A filler material according to claim 1, further comprising a carbonate selected from the group consisting of limestone, chalk and dolomite and wherein said carbonate and hydrated silicate are mixed together before the heat treatment which is carried out at a temperature no higher than 500°C.

* * * * *